(12) United States Patent
Ashida

(10) Patent No.: US 6,227,323 B1
(45) Date of Patent: May 8, 2001

(54) EXHAUST CONTROL SYSTEM FOR SNOWMOBILE ENGINE

(75) Inventor: Takashi Ashida, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/028,051

(22) Filed: Feb. 23, 1998

(30) Foreign Application Priority Data

Nov. 20, 1997 (JP) .................................................. 9-319680

(51) Int. Cl.$^7$ .................................................. B62M 27/02
(52) U.S. Cl. .................... 180/190; 180/186; 180/309; 123/65 PE; 123/323
(58) Field of Search .................... 180/190, 186, 180/182, 68.3, 309; 440/89; 123/65 PE, 323, 312, 314, 324

(56) References Cited

U.S. PATENT DOCUMENTS

| | | | |
|---|---|---|---|
| 3,795,287 | * 3/1974 | Rose | 180/309 |
| 4,785,626 | * 11/1988 | Shiraishi | 60/313 |
| 4,795,420 | * 1/1989 | Sakurai et al. | 180/309 |
| 4,892,164 | * 1/1990 | Yasui et al. | 180/68.3 |
| 5,117,932 | * 6/1992 | Kurosu | 180/68.3 |
| 5,152,255 | 10/1992 | Fukuda . | |
| 5,152,365 | * 10/1992 | Aoshima | 180/68.3 |
| 5,279,381 | * 1/1994 | Fukuda | 180/190 |
| 5,934,958 | * 8/1999 | Ochiai | 123/65 PE |
| 5,992,552 | * 11/1999 | Eto | 180/190 |

FOREIGN PATENT DOCUMENTS

403281492 * 12/1991 (JP) ..................................... 180/309

* cited by examiner

*Primary Examiner*—Anne Marie Boehler
(74) *Attorney, Agent, or Firm*—Knobbe, Martens, Olson & Bear LLP

(57) ABSTRACT

A snowmobile comprised of a frame having a centerline in a front to rear direction, an engine supported by the frame, the engine having a body defining at least one combustion chamber and having a crankshaft extending generally perpendicular to the centerline and arranged to drive a snow-engaging drive member is disclosed. The engine of the snowmobile has an exhaust system including an exhaust passage extending through the body from the combustion chamber, an exhaust pipe leading from the exhaust passage along a first side of the engine, a valve member movably mounted with respect to the body for controlling the timing of the flow of exhaust through the passage, and a drive for moving the valve, the drive including a motor positioned on an opposite side of the centerline of the snowmobile from the exhaust pipe.

3 Claims, 6 Drawing Sheets

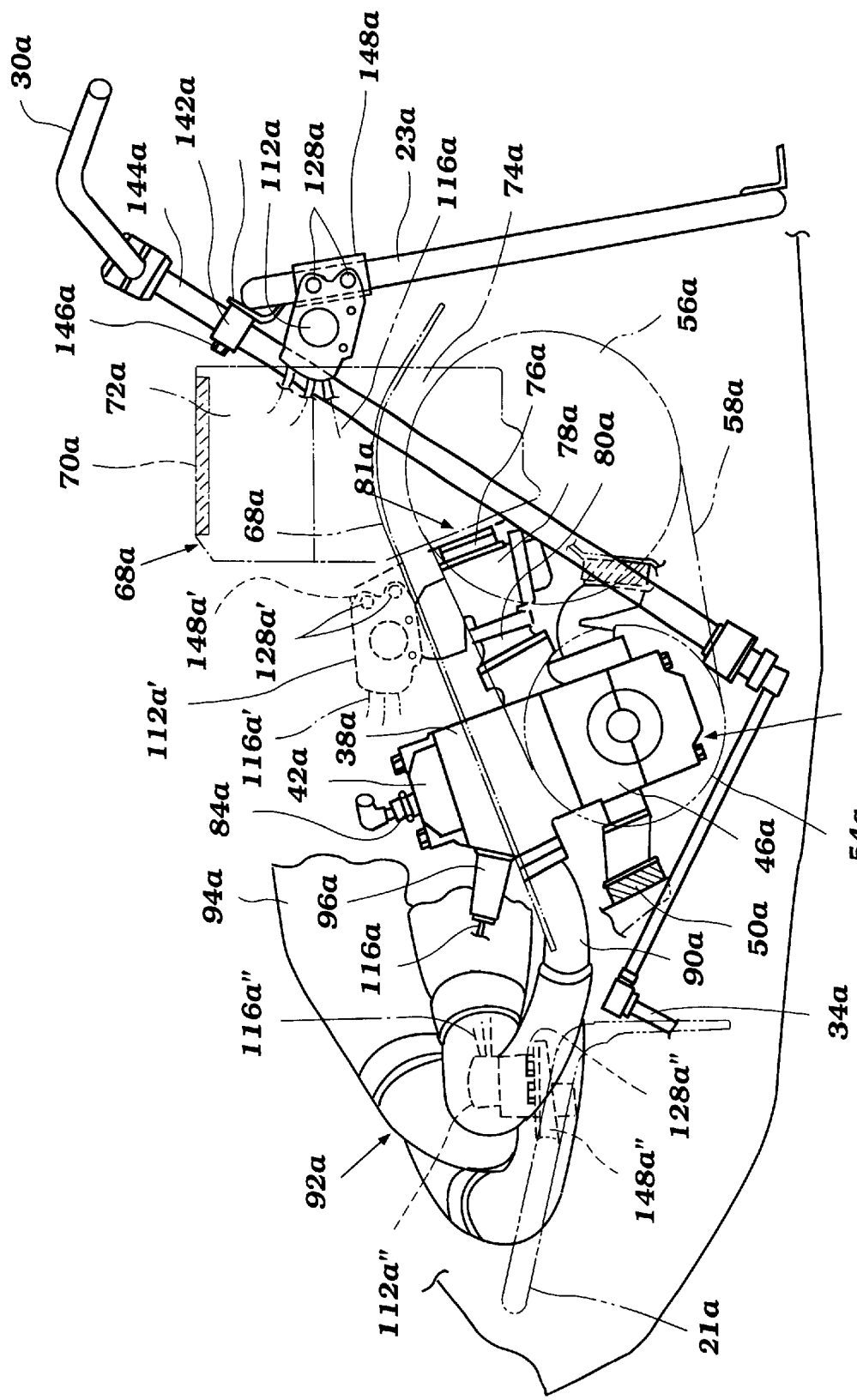

EXHAUST CONTROL SYSTEM FOR SNOWMOBILE ENGINE

FIELD OF THE INVENTION

This invention relates to an engine powering a snow vehicle such as a snowmobile and more particularly to an exhaust control system for such an engine.

BACKGROUND OF THE INVENTION

Snow vehicles such as snowmobiles generally ride upon one or more skis and a driven track. The track is driven by one or more drive wheels which are turned by an output shaft of an internal combustion engine.

Two-cycle internal combustion engines are the most common type of engine used to power snowmobiles. These engines have a large power output relative to their size.

As is well known in the art of two-cycle engines, an exhaust timing control valve is provided corresponding to the exhaust port of each combustion chamber or cylinder of the engine. The exhaust timing control valve is of the type which does not ever completely close the exhaust port, but moves between positions in which it partially obscures the port to varying degrees.

Generally, the timing valve is moved to a retracted position in which the valve does not obscure or obscures very little of the port when the engine speed is relatively high. In this manner, the exhaust time is lengthened. On the other hand, when the engine speed is relatively low, the valve is moved to a position in which it obscures a larger portion of the port. This delays the opening of the exhaust port and thus increases the duration of combustion. This permits higher power output with lower emissions.

A problem arises with the use of this type of exhaust timing system when the engine is mounted in a snowmobile or similar snow vehicle. Snowmobiles are often operated on very rough terrain and the intense vibrations which are transmitted through the frame may damage the exhaust timing valve system. In addition, the engine is normally mounted in an enclosed space defined by a shroud of the snowmobile in order to maintain the operating temperature of the engine. The higher temperatures within the shroud may also damage the exhaust timing valve system.

It is, therefore, a principal object of this invention to provide an improved exhaust control system for an engine powering a snowmobile or similar snow vehicle.

SUMMARY OF THE INVENTION

The present invention relates to a snowmobile including a frame having a centerline in a front to rear direction. An engine is supported by the frame, the engine having a body defining at least one combustion chamber and having a crankshaft extending generally perpendicular to the centerline. The crankshaft is arranged to drive a snow-engaging drive member, such as a drive track.

The engine of the snowmobile has an exhaust system including an exhaust passage extending through the body from the combustion chamber and an exhaust pipe leading from the exhaust passage along a first side of the engine and on one side of the centerline. A valve member is movably mounted with respect to the body for controlling the timing of the flow of exhaust through the passage.

A drive mechanism is provided for moving the valve. In accordance with the present invention, this drive includes a motor positioned on an opposite side of the centerline of the snowmobile from the exhaust pipe.

Further objects, features, and advantages of the present invention over the prior art will become apparent from the detailed description of the drawings which follows, when considered with the attached figures.

BRIEF DESCRIPTION OF THE DRAWINGS

FIG. 6 is a side view of an engine having an exhaust control system in accordance with the second embodiment of the invention, with a shroud of a snowmobile illustrated in phantom.

DETAILED DESCRIPTION OF THE PREFERRED EMBODIMENT OF THE INVENTION

Figure 1:
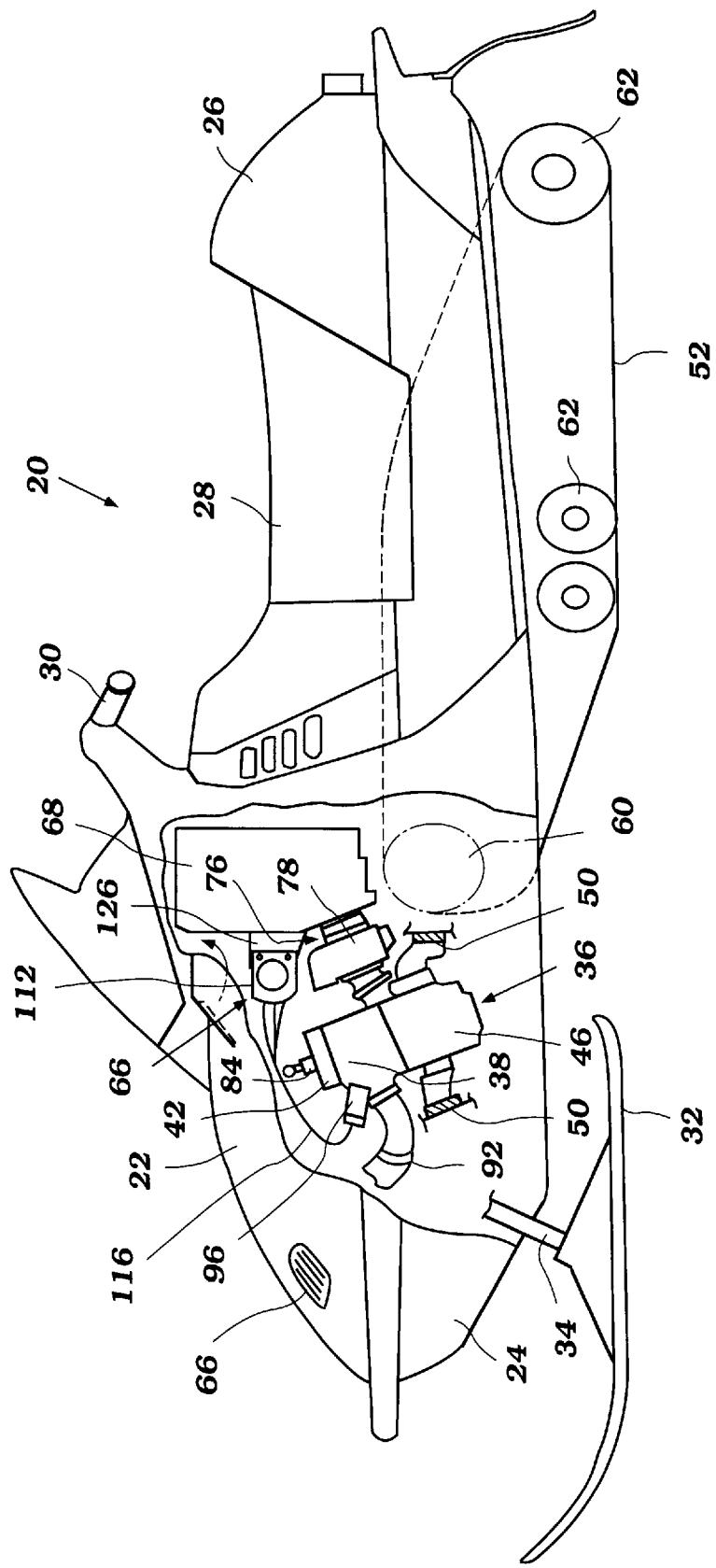
FIG. 1 is a side elevational view of a snowmobile with a portion of a shroud of the snowmobile cut away to expose an engine therein, the engine having an exhaust control system in accordance with a first embodiment of the present invention.

Referring now in detail to the drawings and initially to FIG. 1, a snowmobile constructed in accordance with a preferred embodiment of the invention is identified generally by the reference numeral 20. Since the invention deals primarily with the an exhaust control system for an engine powering the snowmobile 20, the overall construction of the snowmobile 20 will be described only generally. Specific details of the snowmobile 20 are well known to those of skill in the art.

The exhaust control system of the present invention is described for use with an engine powering a snow vehicle such as a snowmobile 20 since this is an application for which the invention has particular utility. Those of skill in the art will appreciate, however, that the invention may be used in a variety of other applications.

In the figures, the direction Fr indicates the direction to the front of the snowmobile 20.

The snowmobile 20 includes a frame assembly which is not illustrated in detail, but referring to FIG. 2, preferably includes a front bumper 21 and a C-shaped frame member 23 for supporting a steering shaft extending between a steering handle and ski (discussed in detail below). The frame is enclosed at a front end of the snowmobile by a front cover or shroud 22 at the top and a pan 24 at the bottom. A similar cover or shroud 26 is positioned at the top rear portion of the snowmobile 20.

A seat 28 is disposed on a top portion of the snowmobile 20 between the front and rear shrouds 22,26. A control handlebar assembly 30 is positioned just forward of the seat 28 for operation of the snowmobile 20 by a rider seated on the seat 28.

A pair of front skis 32 are journalled by respective ski suspension struts 34. Each strut 34 is connected by a steering linkage to the steering handle 30 for steering movement of the front skis 32 in a known manner.

Contained within the interior of the front portion of the body defined by the frame as covered by the front shroud 22 and pan 24 is an internal combustion engine 36. The engine 36 preferably operates on a two-cycle principle and has three cylinders. The engine 36 may have as few as one or more than three cylinders, as known to those of skill in the art.

Figure 4:
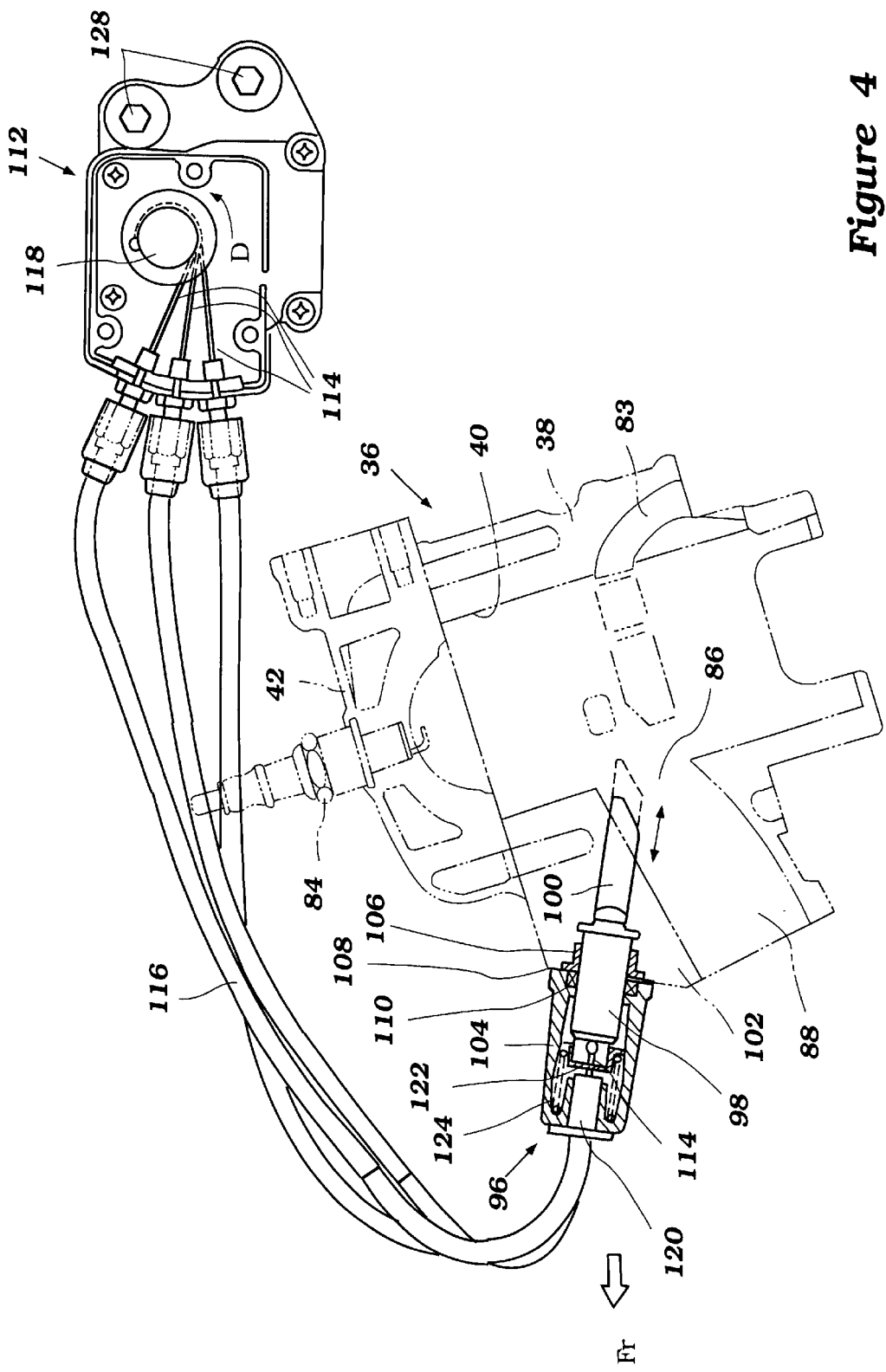
FIG. 4 is a schematic illustrating the exhaust control system in accordance with the first embodiment of the invention, the engine illustrated in phantom.

Referring to FIG. 4, the engine 36 has a cylinder body or block 38 defining three cylinder bores 40. A cylinder head 42 is connected to a top end of the block 38, enclosing the top end of each bore 40.

A piston (not shown) is movably mounted in each bore 40. A top of the piston, along with the cylinder block 38 and head 42 defines a combustion chamber corresponding to each bore 40.

Each piston is connected to a crankshaft 44 (see FIG. 3) which extends along an axis A (see FIG. 2) which is generally transverse to a longitudinal centerline C through the snowmobile 20 from its front end to rear end.

Figure 3:
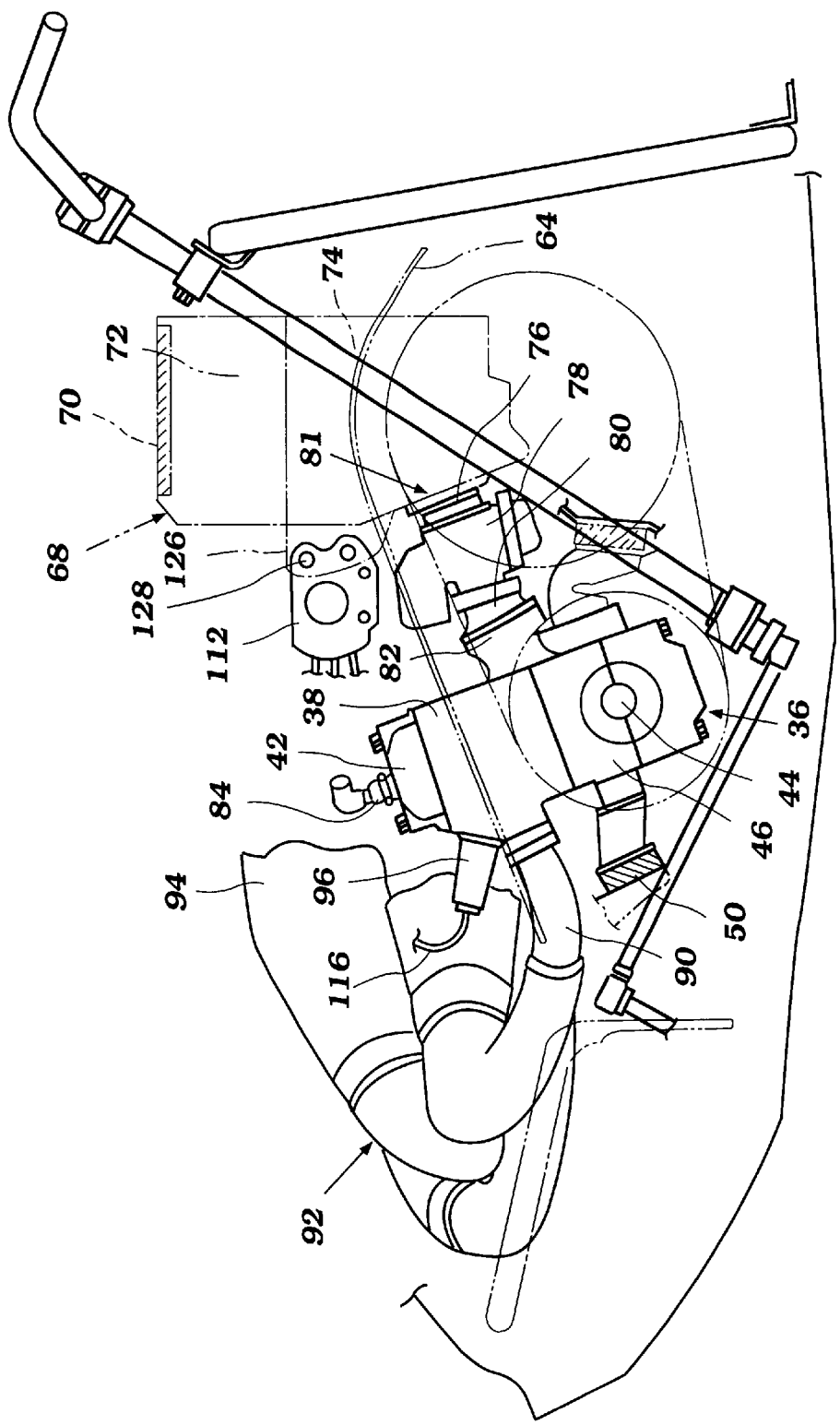
FIG. 3 is side view of the engine illustrated in FIG. 2, with a shroud of the snowmobile illustrated in outline.

The crankshaft 44 is rotatably mounted in a crankcase defined by a crankcase cover 46 connected to the end of the cylinder block 38 opposite the head 42 (see FIG. 1). Referring to FIGS. 1 and 3, the engine 36 is connected to the frame of the snowmobile 20 with one or more engine mounts 50.

Figure 2:
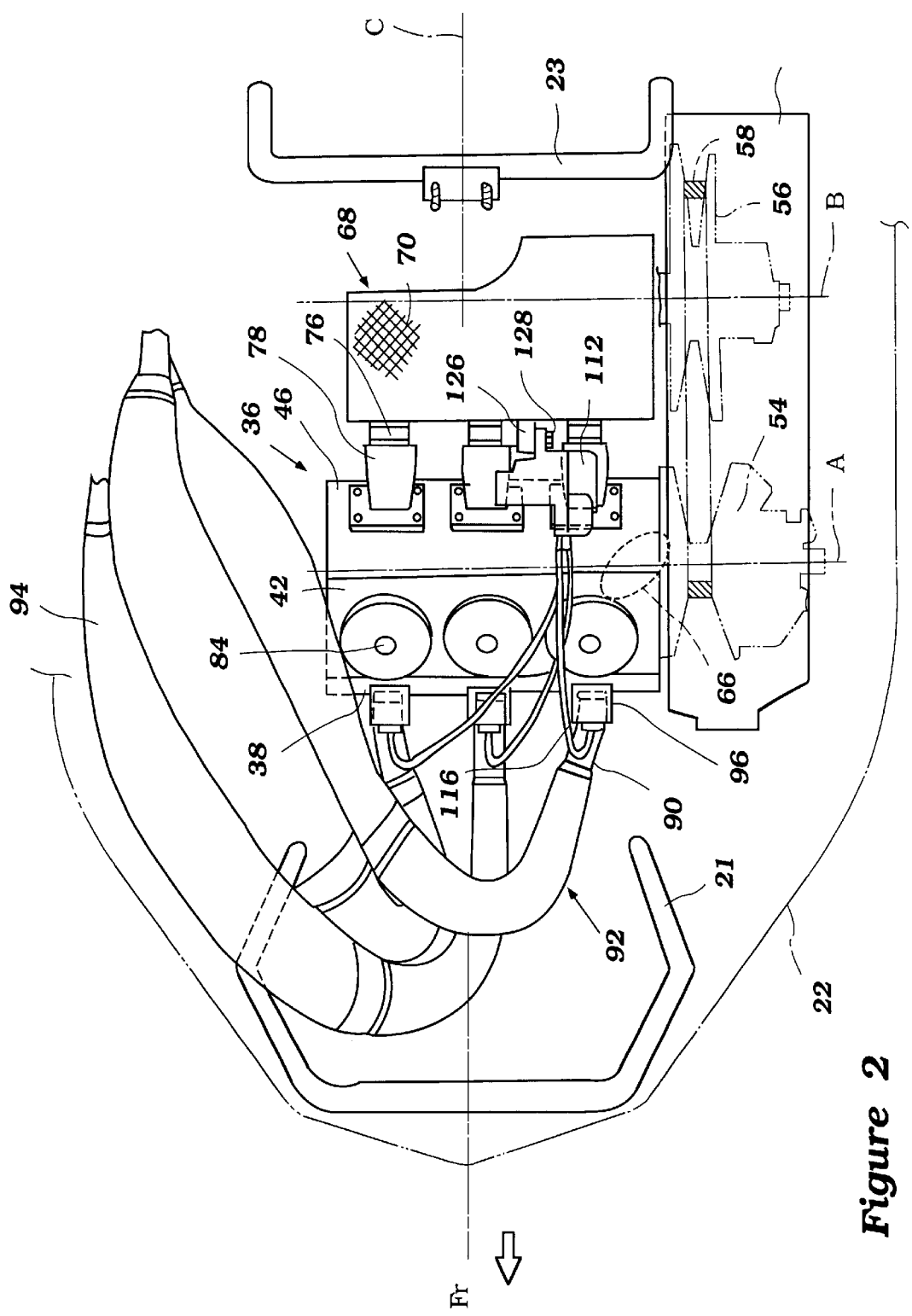
FIG. 2 is a top view of the engine having the exhaust control system illustrated in FIG. 1, with portions of the snowmobile illustrated in phantom.

Referring to FIGS. 1–3, the crankshaft 44 drives a snow engaging drive associated with the snowmobile 20. Preferably, this drive comprises a drive track 52 which is driven by the crankshaft 44 through a variable clutch type transmission. Preferably, the crankshaft 44 drives a primary clutch 54 which selectively drives a secondary clutch 56 with a drive belt 58. The secondary clutch 56 rotates about an axis B which is parallel to axis A and thus also transverse to the centerline C of the snowmobile 20. The secondary clutch 56 in turn selectively drives the drive track 52 by a drive wheel 60 connected thereto.

The drive track 52 is driven by the drive wheel 60 and is rotatably supported by one or more guide or driven wheels 62, as is well known to those of skill in the art.

The transmission mechanism is preferably positioned beneath a protective cover 64, as best illustrated in FIG. 2.

Air and fuel are supplied to each combustion chamber of the engine 36 for use in the combustion process. Referring to FIG. 1, air flows through a pair of air inlets 66 in the front shroud 22 to the space surrounding the engine 36. Air then flows through an intake system of the engine 36 to each combustion chamber.

This intake system includes an air box 68 having a filtered inlet 70. Preferably, as illustrated in FIG. 3, the air box 68 is divided into upper and lower sections 72,74. Air within the box 68 flows therefrom through an intake pipe 76 corresponding to each combustion chamber. The intake pipe 76 leads to a carburetor 78, and thereon through a passage through an intake manifold 80 connected to an intake guide portion 82 of the engine 36.

As illustrated in FIG. 2, an intake pipe 76, carburetor 78 and manifold 80 are provided for each cylinder, there thus being three such combinations in this instance. The intake pipe 76, carburetor 78 and manifold 80 cooperate to define an air flow path or passage 81 leading from the air box 68 to an inlet defined in the intake guide portion 82 of the engine 36.

Although not shown, the engine 36 preferably includes a reed or similar type valve for controlling the flow of air through the inlet defined by each intake guide portion 82 into the crankcase chamber of the engine. The crankcase chamber is divided into compartments corresponding to each cylinder. As is known in the art of two-cycle engines, when the piston in a particular cylinder moves downwardly, the air (and fuel) within the crankcase chamber compartment is compressed, ultimately flowing through one or more scavenge passages 83 (see FIG. 4) to the combustion chamber. Upon the piston's upward stroke, air is drawn through the intake system into the crankcase chamber. During this process, exhaust is also flushed out of the combustion chamber, as described in more detail below.

Fuel is supplied to the air passing through the carburetor 78. Fuel is supplied to each carburetor 78 with an appropriate fuel system which preferably includes a fuel tank mounted to the snowmobile 20. The rate of fuel delivery is preferably controlled by a throttle (not shown) operated by the rider of the snowmobile 20.

Combustion of the fuel and air charge which is delivered to each combustion chamber is initiated with a spark plug 84 or similar ignition element. The spark plug 84 is preferably charged with electrical energy with an appropriate ignition system.

The combustion products are routed from the cylinder through an exhaust system. Referring to FIG. 4, this exhaust system includes an exhaust port 86 provided in the cylinder bore 40 which leads to an exhaust passage 88 extending through the cylinder block 38.

In the embodiment illustrated, the intake system of the engine 36 is positioned at a rear side of the engine and the exhaust system is positioned at the opposite or front side (i.e. facing the front of the snowmobile 20) of the engine from the intake system.

Referring to FIG. 3, an exhaust manifold 90 is provided corresponding to each exhaust passage 88. Each manifold 90 is connected to the cylinder block 38 and defines a passage leading from the exhaust passage 88 through the cylinder block. Each manifold 90 generally comprises a short pipe section which extends outwardly from the front end of the engine 36.

In the embodiment illustrated, the intake system of the engine 36 is positioned at a rear side of the engine and the exhaust system is positioned at the opposite or front side (i.e. facing the front of the snowmobile 20) of the engine from the intake system.

An exhaust pipe 92 is connected to the manifold 90 at its end opposite the cylinder block 38. Each exhaust pipe 92 preferably extends first generally towards the front end of the snowmobile 20 and then curves towards one side of the engine 36 (see FIGS. 2 and 3).

A muffler 94 is connected to each exhaust pipe 92. The mufflers 94 extend along a side of the engine 36, and preferably that side opposite the drive belt drive mechanism, towards the rear end of the snowmobile 20. As illustrated in FIG. 2, the mufflers 94 all extend along one side of the centerline C through the snowmobile 20. Although not shown, the mufflers 94 preferably extend, such as through connection of an elongate exhaust pipe, to an exhaust discharge towards the rear end of the snowmobile 20.

Means are provided for controlling the timing of the flow of exhaust from each cylinder. Preferably, this means includes an exhaust timing valve 96 and means for moving the valve.

The valve 96 will be described in detail with reference to FIG. 4. As illustrated, the valve 96 of the sliding-knife type.

Those of skill in the art will appreciate that the valve 96 may have other forms, such as a rotating valve.

This type of valve 96 has a shaft 98 with a disc or blade 100 extending therefrom. The blade 100 extends through a slot in a wall 102 portion of the cylinder block 38, the slot terminating in the exhaust passage 88 leading from the cylinder. The shaft 98 extends from the slot to a point exterior to the cylinder block 38, where it is contained in a housing 104.

Preferably, a collar 106 is mounted to the cylinder block 38 in the slot at the exterior surface of the block. The collar 106 preferably comprises a durable material, such as high strength steel. The shaft 98 of the valve 96 passes through the collar 106, the collar 106 thus serving as a wear-reducing sleeve.

A gasket 108 is provided between the housing 104 and the cylinder block 38 at the mounting interface. In addition, an oil seal 110, such as an "O"-ring, is secured within the housing 104 and surrounds the shaft 98 of the valve 96. These elements 108, 110 serve to reduce the blow-by of exhaust and oil between the valve 96 and slot.

The means for moving the valve 96 preferably comprises a drive motor 112 which drives the valve remotely through a transmission mechanism. This mechanism comprises a wire 114 partially housed in a covering or sheath 116.

As illustrated, a first end of the wire 114 is connected to a drive shaft 118 of the motor 112. The wire 114 extends through a passage in the covering 116 to the shaft 98 of the valve 96.

At the valve 96, the wire 114 preferably slidably extends through a sleeve 120 connected to the housing 104, and then through a bracket 122 connected to the end of the shaft 98 opposite the blade 100.

The valve 96 is moveable between first and second positions. In a first position, illustrated in phantom in FIG. 4, the blade 100 extends into the exhaust passage 88, reducing the cross-sectional area of the exhaust port 86. In this position, the timing of the opening of the exhaust port is delayed (as the piston moves downwardly), and the timing of the closing of the exhaust port is quickened (as the piston moves back up), thus shortening the total time that exhaust is permitted to flow through the exhaust port 86 from the combustion chamber.

The exhaust valve 96 is moveable to a second position (illustrated in FIG. 4) in which the blade 100 is retracted from the exhaust passage 88 into the slot, increasing the cross-sectional area of the exhaust port 86. In this position, the exhaust port 86 opens sooner and closes later, thus providing for a long exhaust cycle as compared to when the valve 96 is in the above-described position.

Of course, the valve 96 may be moved to a variety of positions between the first and second positions, with the exhaust timing dependent on the degree to which the exhaust port 86 is obscured. Although the particular exhaust control valve 96 strategy may vary, generally the exhaust valve 96 is moved to its first position when the engine 36 is operating at low speed, and moved to the second position when the engine is operating at high speed.

Referring to FIG. 4, means are provided for biasing the valve 96 into its first position (illustrated in phantom). This means preferably comprises a coil or compression spring 124 mounted between the housing 104 and the top end of the shaft 98.

The motor 112 is preferably of the electrically powered type and may be driven in accordance with an appropriate control strategy by an electronic control unit (ECU) or other control. The wire 114 is partially wrapped around the drive shaft 118. When powered, the motor 112 effects rotation of the drive shaft 118 in the direction D in FIG. 4. The rotation of the shaft 118 wraps the wire 114 around the shaft 118, shortening its effective length between the motor 112 and valve 96. This draws the valve 96 in the direction out of the cylinder block 38 against the spring force. This moves the valve 96 to the second position. When the power to the motor 112 is shut off, the spring 124 presses the shaft 98 inwardly (and draws the wire 114 towards the valve 96 from the motor 112, rotating the shaft 118 in the opposite direction of D). This moves the valve 96 to the first position.

As illustrated in FIG. 2, the drive motor 112 is preferably mounted to a mount or stay 126 extending from the air box 68 with bolts 128 or similar connectors. So positioned, the motor 112 is positioned on the opposite side of the engine 36 (i.e. to the rear side) from the exhaust system. In addition, the motor 112 is positioned on the opposite side of the centerline C from the exhaust system. In this position, the motor 112 is protected from the high heat associated with the exhaust system, prolonging the life of the motor 112.

Figure 5:
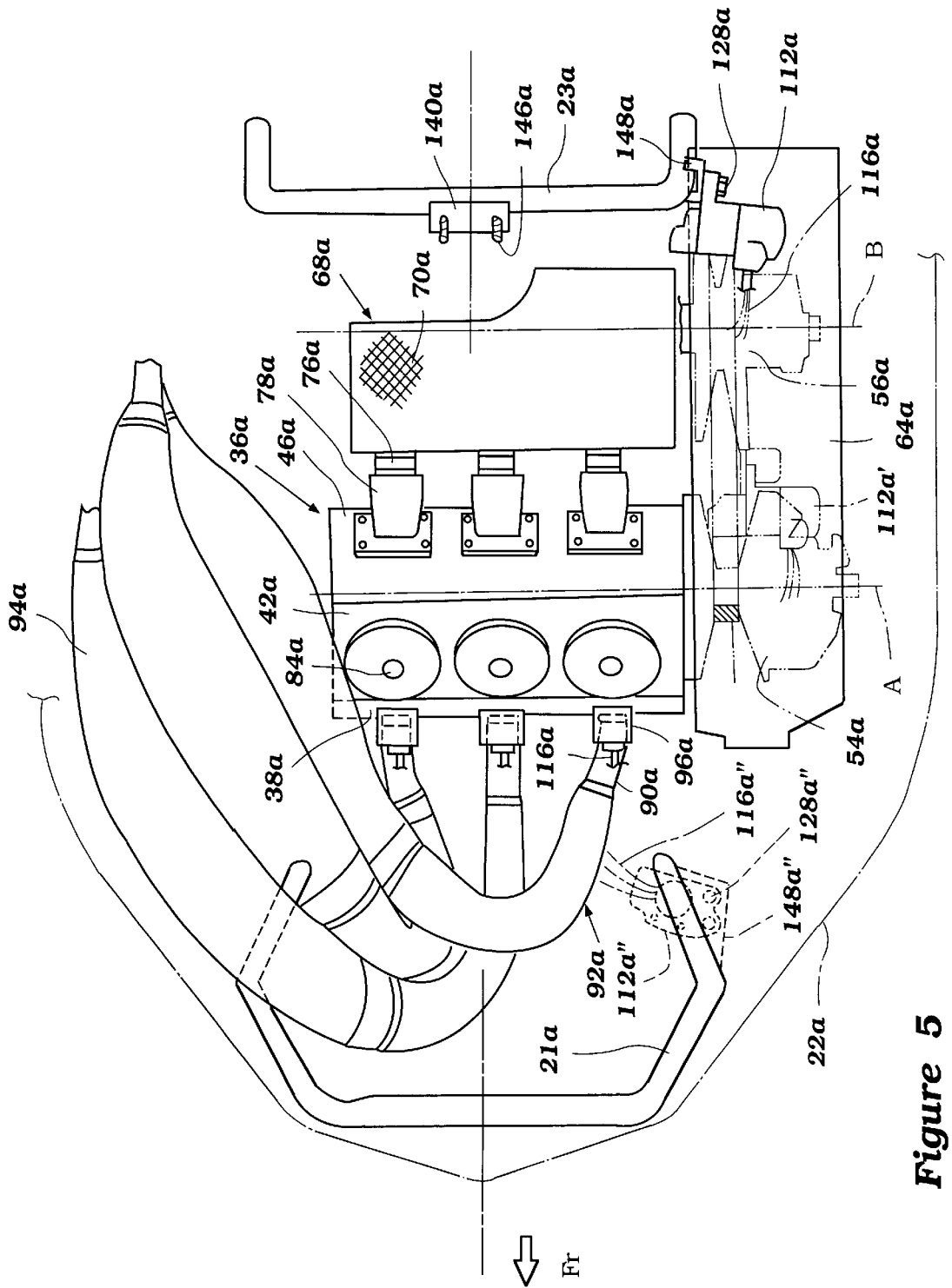
FIG. 5 is a top view of an engine having an exhaust control system in accordance with a second embodiment of the present invention, with portions of a snowmobile illustrated in phantom.

A second embodiment of the present invention is illustrated in FIGS. 5 and 6. In the description and illustrations of this embodiment of the invention, like reference numerals are used to identify like or similar elements to those of the first embodiment, except that an "a" designator has been added to all of the reference numerals of this embodiment.

In a first arrangement of this embodiment, the motor 112a which drives the exhaust valves 96a associated with the engine 36a is mounted to the steering support 23a. As illustrated, a mounting bracket 140a is connected to a generally horizontal spanning portion of the support 23a. This bracket 140a has a collar portion 142a which extends outwardly towards the front end of the snowmobile.

A steering shaft 144a associated with the steering system is mounted to the collar 142a with one or more bolts 146a or similar fasteners. In this manner, the steering shaft 144a is supported by the support 23a.

The motor 112a is preferably supported by a mount 148a which is connected to the support 23a near a top of one of the upwardly extending struts or legs of the support 23a. As illustrated, the motor 112a is connected to the mount 148a with bolts 128a, although other fastening means may be used. In fact, the motor may be directly connected to the mount 148a or the support 23a, such as by welding or by forming the bracket as part of the support 23a.

In this position the motor 112a is again protected from the heat associated with the exhaust system. In addition, the transmission of engine vibration to the motor 112a is reduced since the motor 112a is mounted to the snowmobile frame and not directly to the engine.

Another alternate position for the motor 112a' is best illustrated in FIG. 6. As illustrated therein, the motor 112a' may be positioned between a front surface of the air box 68, the rear surface of the engine 36a, and the intake passage 81a therebetween. The motor 12a' is also positioned above the transmission cover. In this position, the motor 112a is again protected from heat associated with the exhaust system.

Yet another alternate position for the motor 112a" is illustrated in FIGS. 5 and 6. In this position, the motor 112a" is mounted to the bumper 21a near the front of the snowmobile. In particular, a mount 148a" is connected to the bumper 21a, the motor 112a" connected to the mount 148a" with fasteners, such as one or more bolts 128a".

In this arrangement, the motor 112a" is preferably mounted to that portion of the bumper 21a which is farthest from the exhaust system, including the mufflers 94a. Here, the motor 112a" is protected from the heat associated with the exhaust system and the transmission of engine vibration to the motor 112a" is reduced as compared to when the motor is connected directly to the engine.

The exhaust control system of the present invention has been described in conjunction with a specifically arranged snowmobile 20. Those of skill in the art will appreciate that the particular snow vehicle may deviate from that described above, having a different frame arrangement, different snow supporting ski or drive arrangement or the like.

Of course, the foregoing description is that of preferred embodiments of the invention, and various changes and modifications may be made without departing from the spirit and scope of the invention, as defined by the appended claims.

What is claimed is:

1. A snowmobile comprised of a frame having a centerline extending in a front to rear direction, an engine supported by said frame, said frame of said snowmobile includes a bumper member positioned in front of said engine, said engine having a body defining at least one combustion chamber, said engine having a crankshaft extending generally perpendicular to said centerline, a snow-engaging drive member, said crankshaft arranged to drive said drive member, said engine of said snowmobile having an exhaust system including an exhaust passage extending through said body from said combustion chamber, an exhaust pipe leading from said exhaust passage along a first side of said engine to one side of said centerline, a valve member movably mounted with respect to said body for controlling the timing of the flow of exhaust through said passage, and means for moving said valve, said means including a drive motor, said motor positioned on an opposite side of said centerline of said snowmobile from said exhaust pipe, said motor being connected to said bumper member.

2. A snowmobile comprised of a frame having a centerline in a front to rear direction, an engine supported by said frame, said engine having a body defining at least one combustion chamber, said engine having a crankshaft extending generally perpendicular to said centerline, a snow-engaging drive member, said crankshaft arranged to drive said drive member, said engine of said snowmobile having an exhaust system including an exhaust passage extending through said body from said combustion chamber, an exhaust pipe leading from said exhaust passage along a first side of said engine to one side of said centerline, a valve member movably mounted with respect to said body for controlling the timing of the flow of exhaust through said passage, and means for moving said valve, said means including a drive motor, said frame of said snowmobile includes a steering mechanism including a steering shaft and a support member supporting said steering shaft, said support member extending generally vertically upward, said motor being mounted to said support member and positioned on an opposite side of said centerline of said snowmobile from said exhaust pipe.

3. A snowmobile comprised of a frame having a centerline in a front to rear direction, an engine supported by said frame, said engine having a body defining at least one combustion chamber, said engine having a crankshaft extending generally perpendicular to said centerline, a snow-engaging drive member, said crankshaft arranged to drive said drive member through a transmission positioned at a side of said engine, said transmission including at least one sprocket and a cover extending over at least a portion of said sprocket, said engine of said snowmobile having an exhaust system including an exhaust passage extending through said body from said combustion chamber, an exhaust pipe leading from said exhaust passage along a first side of said engine to one side of said centerline and on the side opposite said transmission, a valve member movably mounted with respect to said body for controlling the timing of the flow of exhaust through said passage, and means for moving said valve, said means including a drive motor, said motor being positioned above said transmission cover and on an opposite side of said centerline of said snowmobile from said exhaust pipe.

* * * * *